United States Patent
Fukuda

(10) Patent No.: US 12,321,846 B2
(45) Date of Patent: Jun. 3, 2025

(54) KNOWLEDGE DISTILLATION USING DEEP CLUSTERING

(71) Applicant: INTERNATIONAL BUSINESS MACHINES CORPORATION, Armonk, NY (US)

(72) Inventor: Takashi Fukuda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 709 days.

(21) Appl. No.: 17/116,117

(22) Filed: Dec. 9, 2020

(65) Prior Publication Data

US 2022/0180206 A1    Jun. 9, 2022

(51) Int. Cl.
  *G06N 3/045* (2023.01)
  *G06F 40/44* (2020.01)
  *G06N 3/088* (2023.01)

(52) U.S. Cl.
  CPC .............. *G06N 3/045* (2023.01); *G06F 40/44* (2020.01); *G06N 3/088* (2013.01)

(58) Field of Classification Search
  CPC ........ G06N 3/088; G06N 3/045; G06N 3/047; G06N 3/082; G06N 3/084; G06F 18/2148; G06F 18/23; G10L 15/063; G10L 15/16
  See application file for complete search history.

(56) References Cited

U.S. PATENT DOCUMENTS

| | | | | |
|---|---|---|---|---|
| 5,611,019 A * | 3/1997 | Nakatoh | ............... | G10L 15/063 704/254 |
| 6,067,517 A * | 5/2000 | Bahl | ....................... | G10L 15/20 704/256.4 |
| 7,417,983 B2* | 8/2008 | He | ..................... | H04L 67/1061 370/352 |
| 9,412,361 B1* | 8/2016 | Geramifard | .......... | G06V 10/811 |
| 11,907,845 B2 | 2/2024 | Fukuda et al. | | |
| 2003/0023436 A1* | 1/2003 | Eide | ........................ | G10L 15/02 704/236 |

(Continued)

FOREIGN PATENT DOCUMENTS

| | | |
|---|---|---|
| CN | 110033077 A | 7/2019 |
| CN | 110674880 A | 1/2020 |

(Continued)

OTHER PUBLICATIONS

Asif et al. "Ensemble Knowledge Distillation for Learning Improved and Efficient Networks", Sep. 2019, arXiv.org, <arxiv.org/abs/1909.08097v1> (Year: 2019).*

(Continued)

*Primary Examiner* — James D. Rutten
(74) *Attorney, Agent, or Firm* — Tutunjian & Bitetto, P.C.; Robert Richard Aragona

(57) ABSTRACT

Methods and systems for training a neural network include clustering a full set of training data samples into specialized training clusters. Specialized teacher neural networks are trained using respective specialized training clusters of the specialized training clusters. Soft labels are generated for the full set of training data samples using the specialized teacher neural networks. A student model is trained using the full set of training data samples, the specialized training clusters, and the soft labels.

18 Claims, 8 Drawing Sheets

(56) References Cited

U.S. PATENT DOCUMENTS

| | | | |
|---|---|---|---|
| 2005/0137862 A1* | 6/2005 | Monkowski | G10L 15/06 |
| | | | 704/E15.007 |
| 2008/0300875 A1* | 12/2008 | Yao | G10L 15/065 |
| | | | 704/E15.009 |
| 2009/0222266 A1* | 9/2009 | Sakai | G10L 15/063 |
| | | | 704/254 |
| 2014/0074614 A1* | 3/2014 | Mehanian | G06Q 30/0201 |
| | | | 705/14.64 |
| 2016/0284347 A1* | 9/2016 | Sainath | G10L 15/16 |
| 2017/0270100 A1* | 9/2017 | Audhkhasi | G06F 40/289 |
| 2019/0080684 A1* | 3/2019 | Ichikawa | G10L 15/063 |
| 2019/0378006 A1 | 12/2019 | Fukuda et al. | |
| 2020/0034702 A1 | 1/2020 | Fukuda et al. | |
| 2020/0034703 A1 | 1/2020 | Fukuda et al. | |
| 2020/0186897 A1* | 6/2020 | Dareddy | G06N 3/08 |
| 2021/0407090 A1* | 12/2021 | Li | G06T 7/10 |
| 2022/0188622 A1 | 6/2022 | Nagano et al. | |
| 2022/0188643 A1 | 6/2022 | Fukuda | |
| 2022/0344049 A1* | 10/2022 | Hall | G06N 3/0985 |

FOREIGN PATENT DOCUMENTS

| | | |
|---|---|---|
| CN | 111950302 A | 11/2020 |
| CN | 110852426 A | 3/2023 |
| CN | 111933185 A | 11/2024 |
| WO | 2010/130733 A1 | 11/2010 |
| WO | 2018/169708 A1 | 9/2018 |
| WO | 2020/194077 A1 | 10/2020 |

OTHER PUBLICATIONS

Wu et al., "Learning to Teach with Dynamic Loss Functions", Oct. 2018, arXiv.org, <arxiv.org/abs/1810.12081> (Year: 2018).*

Y. Chebotar and A.Waters, "Distilling knowledge from ensembles of neural networks for speech recognition," Proc. Interspeech, pp. 3439-3443, 2016 (Year: 2016).*

J. Anden and S. Mallat, "Deep Scattering Spectrum," in IEEE Transactions on Signal Processing, vol. 62, No. 16, pp. 4114-4128, Aug. 15, 2014, doi: 10.1109/TSP.2014.2326991 (Year: 2014).*

Price et al., "Wise teachers train better DNN acoustic models", EURASIP Journal on Audio, Speech, and Music Processing, Dec. 2016, pp. 1-19.

Xu et al., "Knowledge Distillation from Multilingual and Monolingual Teachers for End-to-End Multilingual Speech Recognition", Proceedings of APSIPA Annual Summit and Conference 2019, Nov. 2019, pp. 844-849.

Fukuda et al., "Implicit Transfer of Privileged Acoustic Information in a Generalized Knowledge Distillation Framework", Interspeech 2020, Oct. 2020, pp. 41-45.

UK Combined Search and Examination Report issued in corresponding Patent Application No. GB2116914.9 dated Sep. 23, 2022, 13 pages.

Asif et al., "Ensemble Knowledge Distillation for Learning Improved and Efficient Networks", 24th European Conference on Artificial Intelligence. Aug. 29-Sep. 8, 2020. pp. 1-8.

Caron et al., "Deep Clustering for Unsupervised Learning of Visual Features", arXiv:1807.05520v2 [cs.CV]. Mar. 18, 2019. pp. 1-30.

Fukuda et al., "Efficient Knowledge Distillation from an Ensemble of Teachers", Interspeach 2017. Aug. 20-24, 2017. pp. 3697-3701.

Fukuda et al., "Mixed Bandwidth Acoustic Modeling Leveraging Knowledge Distillation", IEEE Automatic Speech Recognition and Understanding Workshop. Dec. 14, 2019. pp. 1-7.

Jung et al., "Distilling the Knowledge of Specialist Deep Neural Networks in Acoustic Scene Classification", 2019 Detection and Classification of Acoustic Scenes and Events. Oct. 25-26, 2019. pp. 114-118.

Mell et al., "The NIST Definition of Cloud Computing", National Institute of Standards and Technology, Special Publication 800-145, Sep. 2011, pp. 1-7.

Niu et al., "GATCluster: Self-Supervised Gaussian-Attention Network for Image Clustering", arXiv:2002.11863v1 [cs.CV]. Feb. 27, 2020. pp. 1-14.

Upadhyay, Ujjwal, "Knowledge Distillation", Neural Machine—Medium. https://medium.com/neuralmachine/knowledge-distillation-dc241d7c2322. Downloaded on Aug. 28, 2020. pp. 1-10.

Xiang et al. "Learning from Multiple Experts: Self-paced Knowledge Distillation for Long-tailed Classification", arXiv:2001.01536 [cs.CV], Sep. 21, 2020, 17 pages.

* cited by examiner

KNOWLEDGE DISTILLATION USING DEEP CLUSTERING

BACKGROUND

The present invention generally relates to machine learning, and, more particularly, to training a compact model that performs the same function as a larger model.

Knowledge distillation training transfers knowledge from a relatively large model to a relatively small model. For example, the larger model may not fully use its processing capacity, such that a smaller model could be trained to perform the same function, while consuming fewer resources.

SUMMARY

A method for training a neural network includes clustering a full set of training data samples into specialized training clusters. Specialized teacher neural networks are trained using respective specialized training clusters of the specialized training clusters. Soft labels are generated for the full set of training data samples using the specialized teacher neural networks. A student model is trained using the full set of training data samples, the specialized training clusters, and the soft labels.

A system for training a neural network includes a hardware processor and a memory that stores computer program code. The computer program code, when executed by the hardware processor, implements a student model, a clustering network. a plurality of specialized teacher neural networks, and a model trainer. The clustering network clusters a full set of training data samples into a plurality of specialized training clusters. The specialized teacher neural networks together generate soft labels for the full set of training data samples. The model trainer trains the plurality of specialized teacher neural networks using respective specialized training clusters of the plurality of specialized training clusters, and trains a student model using the full set of training data samples, the specialized training clusters, and the soft labels.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Knowledge distillation may take a relatively large "teacher model" and may use it to train a relatively small "student model." Student models may incorporate domain-specific knowledge that represents clustered data. In speech recognition and other acoustic processing tasks, such models can incorporate specialized teachers for various acoustic conditions, which may include differences in background noise and differences in the speaker's accent and affect.

Multiple data clusters are generated, which may be used to form specialized teacher models using unsupervised deep clustering. A training pipeline is described herein that uses the multiple teachers to determine soft labels, which are then used in the training of the student model. Because it is difficult to represent multiple acoustic conditions at once in a single model, the use of specialized teacher models helps to capture the differences in acoustic conditions when training the student model.

One objective in automatic speech recognition is to provide robust acoustic modeling against a wide variety of acoustic conditions. Although models are specifically described herein as dealing with acoustic data, it should be understood that alternate forms of data may be used instead. Acoustic data may be expressed as a waveform, for example representing intensity of air pressure over time, but there are many other forms of information that may be expressed as similar waveforms. Thus, input data may include speech signals that are within human hearing range, infrasonic or ultrasonic signals that are outside human hearing range, electromagnetic signals that include waveforms of energy in the electromagnetic spectrum, seismic signals that record movement of the Earth's surface, or any other appropriate waveform data.

While training data may be collected in various conditions, such as differing acoustic conditions, which may include speaker's age, location, group identity, or speaking rate, channel or environment conditions, or ambient noise level, it is not assumed that the data includes labels for such information. Thus, a priori information relating to the acoustic condition may not be available. Training data may therefore be clustered using unsupervised deep clustering to group utterances according to acoustic conditions, and these clusters may be used to train condition-specific teacher networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
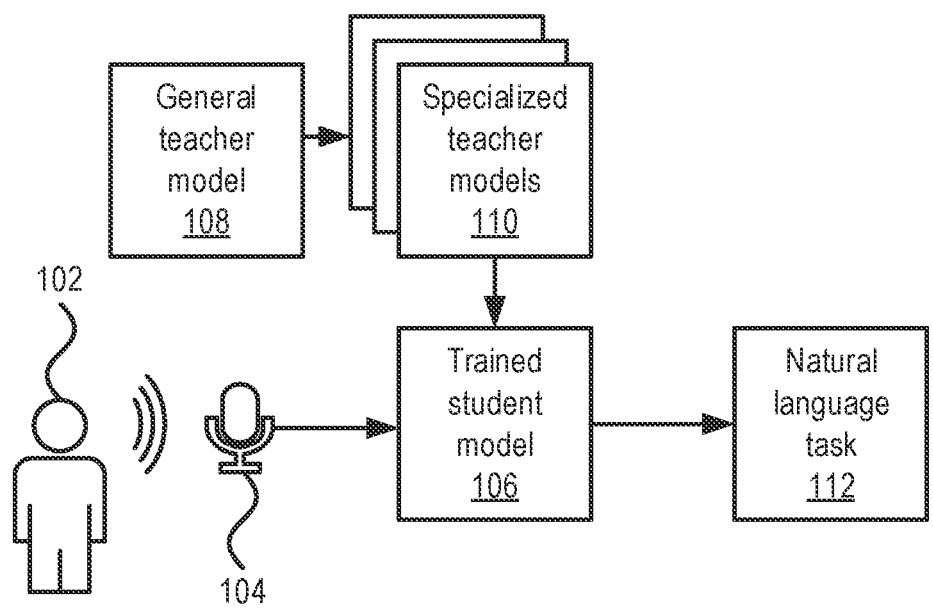
FIG. 1 is a diagram of the training and use of a student model, based on a general teacher model and specialized teacher models for different acoustic conditions, in accordance with an embodiment of the present invention.

Referring now to FIG. 1, an overview of an acoustic processing task is shown. A speaker 102 makes an utterance that is recorded by a microphone 104, which transforms the air pressure waves of the utterance into a waveform. The waveform is processed by a trained student model 106, which, for example, may perform speech recognition on the waveform to determine what the speaker 102 has said. The information generated by the trained student model 106 is then processed as part of a natural language task 112, for example executing a query for requested information or performing an action responsive to a command.

The trained student model 106 may be trained by a set of teacher models, including a general teacher model 108 and specialized teacher models 110. The general teacher model 108 may be trained on a full set of training data, regardless of the acoustic conditions of each constituent waveform. Exemplary structures for the general teacher model 108 may include bidirectional long short-term memory networks, Visual Geometry Group(VGG) convolutional neural networks, and residual neural networks. The general teacher model 108 can be used to determine how the specialized teacher models 110 represent different characteristics from a generic environment. The general teacher model 110 is also used to estimate log likelihoods for context-dependent phonemes as features used for unsupervised clustering, so that properties of automated speech recognition are reflected in the clustering.

The specialized teacher models 110 may be each be trained according to a subset of the training data, for example after the training data has been clustered according to different acoustic conditions. The specialized teacher models 110 may be implemented as model adaptations that begin from the general teacher model 108, keeping the fundamental of each neuron between different teacher models. As compared to the general teacher model 108 and the specialized teacher models 110, the student model 106 may be a neural network that has fewer network parameters. As a result, the student model 106 may operate more quickly than the teacher models. In one particular example, a student model that is used for decoding speech signals may have two convolutional layers, with 128 and 256 hidden nodes respectively, in addition to four fully connected layers with 2048 nodes per layer, to estimate posterior probabilities of 9300 output targets. The output of the student model 106 may have the same format as the outputs of the teacher models.

Convolutional neural networks (CNNs) process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

The clustering may be performed on training data waveforms that are represented as speaker vectors, each including features for phone and phone-level confidence scores for a speaker. The speaker vectors, including the phone-level confidence scores, may be determined from an average across a feature vector sequence from the same speaker.

The general teacher model 108 may thus trained with all of the waveforms in the dataset, or may be trained using a subset that represents an average acoustic condition of the training data. This subset may be generated by, for example, randomly selecting utterances from the training data pool. An initial acoustic model, used for generating the confidence scores, may also be trained from the same data.

After clustering, the training data may be divided into N classes to create acoustic domain-specific data sets $d_n$, where n is one of the N classes, using unsupervised deep learning. The specialized teacher models 110 are then trained using respective data sets $d_n$, adapting the general teacher model 108.

To train the student model 106, soft labels $l_n$ are generated using the corresponding specialized teacher models 110. The student network 106 is then trained with all of the training data $d_n$, with the corresponding soft label set $l_n$. The soft labels generated by the specialized teacher models 110 may have better quality for the corresponding acoustic condition domain than the general teacher model 108. The student model 106 thus implicitly includes the discriminative abilities of the various specialized teacher models 110.

Figure 2:
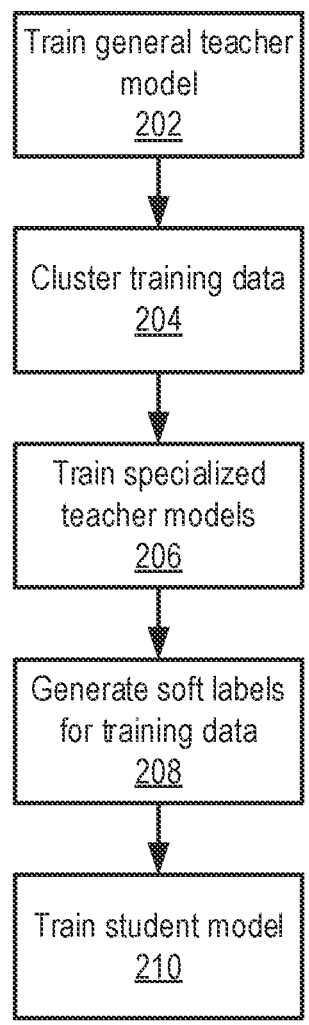
FIG. 2 is a block/flow diagram of a method for training a student model based on a general teacher model and specialized teacher models for different acoustic conditions, in accordance with an embodiment of the present invention.

Referring now to FIG. 2, a method for training a student model 106 is shown. Block 202 begins by training the general teacher model 108 using, for example, an entire training dataset or a randomly sampled subset of the entire training dataset. This training may be performed using, e.g., stochastic gradient descent and back-propagation, minimizing a cross-entropy loss between the predicted output from the teacher models and predefined training data labels.

Block 204 performs clustering on the training data, for example using unsupervised deep clustering. Deep clustering may be performed, for example, using a deep neural network, iteratively grouping features using a clustering process (e.g., k-means), using subsequent assignments as supervision to update the weights of the network. Each iteration of clustering is used to provide pseudo-labels for the training data, which are then used in the next iteration of clustering. A set of N clusters $d_n$ are formed, each including a respective subset of the training data waveforms. While other forms of clustering may be used in place of deep clustering, a deep clustering approach may provide superior performance in a framework that is based on multiple specialized models.

Block 204 may employ a clustering neural network model, which may include feature mapping layers, classifying layers, and a k-means clustering component. The feature mapping layers convert input signals into an intermediate representation of features. The classifying layers then perform a classification of the intermediate representation. The feature mapping and classifying layers are combined when weight parameters are updated.

The intermediate features from the mapping layers are clustered into categories with, e.g., k-means clustering, independent of the network of the mapping and classifying layers. The category of the data, given by the k-means is used as a pseudo reference label to update the entire clustering network. A parameterized classifier objective function, which predicts the correct labels on top of the feature mapping $f_\theta(x_n)$ may be expressed as:

$$\min_{\theta, W} \frac{1}{N} \sum_{n=1}^{N} \ell(g_W(f_\theta(x_n)), y_n)$$

where $\theta$ is the set of parameters corresponding to the feature mapping function $f_\theta$, $\ell$ is the negative log-softmax function, $y_n$ is a pseudo label obtained from k-means clustering associated with input signal $x_n$, and W are parameters of the classifier. The parameters $\theta$ and W are jointly learned by optimizing this objective function, for example by using a mini-batch stochastic gradient descent (SGD), with training using backpropagation. The features are thus iteratively grouped together.

It may be assumed that each speaker speaks in specific acoustic conditions. Every utterance in the training data may be expressed using a D-dimensional super-vector, which may be formed by concatenating averaged log Mel-frequency features (and their delta and double-delta) for every context-dependent phoneme. The averaged log Mel-frequency features may be computed after forced alignments are performed for the utterance. The average log likelihoods for each phoneme obtained during the alignment estimation process may also be attached to the supervector, so that the size of the super-vector is D=F×P+S, where F is the dimension of the log Mel-frequency features, P is the number of context-dependent phonemes, and S is the number of log likelihoods used in making the supervector, which may be equal to P.

If the phoneme context dependency is, for example, triphone or quinphone, the size of the supervector may become too large to be used as practical inputs for the clustering network. The supervector may therefore be compressed, for example by principal component analysis (PCA), to a more tractable size, or context independent phonemes may be used instead.

When an utterance is phonetically well-balanced, then the utterance vector may be a good representation of only the acoustic characteristics, as the channel-related characteristics may be averaged out. In contrast, if utterances are short, or are not well-balanced, the vector may include phonetically biased components. Such information is useful, however, because it represents linguistically meaningful properties that can be used by the specialized teacher models 110. Using supervectors that include all utterances for each speaker helps to obtain phonetically well-balanced representations.

Thus, to cluster the training data using this system, phone alignment information may be generated to represent which phoneme each frame belongs to. Taking an average across the same phoneme, a supervector can be generated for each speaker. Each phone will have a respective first part of the speaker vector that includes the corresponding features, followed by an average confidence score for the phone. The phone level confidence score may be estimated and attached to the speaker vector to incorporate speech recognition information for clustering. This creates an additional set of components for each phone that corresponds to the number of phonemes.

Block 206 trains specialized teacher models 110. Each specialized teacher model 110 uses a respective subset $d_n$ as training data to produce a model that is trained on waveforms having a particular acoustic condition. These specialized teacher models 110 are then used in block 208 to generate soft labels $q_{sp}$ for the respective subsets of training data, while the general teacher model 108 is used to generate soft labels $q_{bl}$ for the entire set of training data.

Block 210 then trains the student model 106 using the soft labels and the clustered training data. Block 210 may employ a two-way loss function for training the student model 106. For example, the loss function may be expressed as follows:

$$\mathcal{L}(\theta) = (1-\lambda)\mathcal{L}_{bl}(\theta) + \lambda\mathcal{L}_{sp}(\theta)$$

$$\mathcal{L}_{bl}(\theta) = -\sum_i q_{bl}(i|x)\log p(i|x)$$

$$\mathcal{L}_{sp}(\theta) = -\sum_i q_{sp}(i|x)\log p(i|x)$$

where $\lambda$ is a hyperparameter that weights the two different loss components, $q_{bl}(i|x)$ represents soft labels from the general teacher model 108, $q_{sp}(i|x)$ represents soft labels from the specialized teacher models 110, x is an input feature, and p(i|x) is an output probability of a class from the student model 106, with i indicating an index of context-dependent phonemes. The hyperparameter $\lambda$ may be set to, e.g., 0.5.

The loss $\mathcal{L}_{sp}$ for the specialized teacher models 110 is first computed between the predicted output for the categorized data $d_n$ and corresponding soft labels $q_{sp}(i|x)$. The same data is passed through the general teacher model 108 to generate the loss $\mathcal{L}_{bl}$ for the general teacher model 108. The parameters of the student network 106 are updated to minimize the combined loss $\mathcal{L}$.

The two components of the loss function each attempt to minimize the differences between the distributions of the student model 106 and the general teacher model 108, and between the distributions of the student model 106 and the specialized teacher models 110. With soft labels q, competing classes will have small, but non-zero, probabilities for each training example. The Kullback-Leibler (KL) divergence criterion, which may be used for training the student model 106, equivalently also minimizes the combined cross entropy of the soft target labels.

Figure 3:
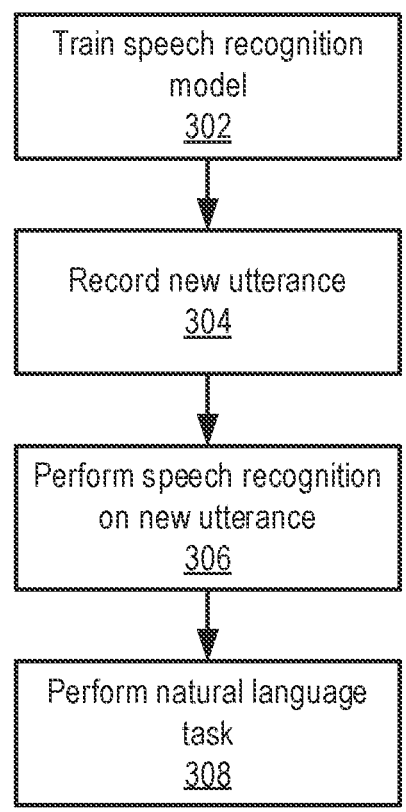
FIG. 3 is a block/flow diagram of a method for performing speech recognition and a natural language task on a new utterance using a trained student model, in accordance with an embodiment of the present invention.

Referring now to FIG. 3, a method of performing a natural language task is shown. Block 302 trains the student model 106, for example using the general teacher model 108 and the specialized teacher models 110, on a set of training data that includes a variety of utterance waveforms. Block 304 records a new utterance, for example using the microphone 104.

Block 306 performs speech recognition on the new utterance, for example using the trained student model 106. The trained student model 106 may output, for example, a set of phonemes that correspond to the different sounds in the utterance. In some cases, the trained student model 106 may further convert the phonemes to full words and sentences, representing the new utterance as a string of text.

Block 308 then performs a natural language task 112 on the text. For example, the natural language task 112 may include a chatbot that implements a question answering system. In such an example, the natural language task 308 identifies the user's intent from a spoken utterance, identifies a request for certain information, and then provides the requested information. In another example, the natural language task 112 may include an execution engine that performs a command encoded in the new utterance.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 4:
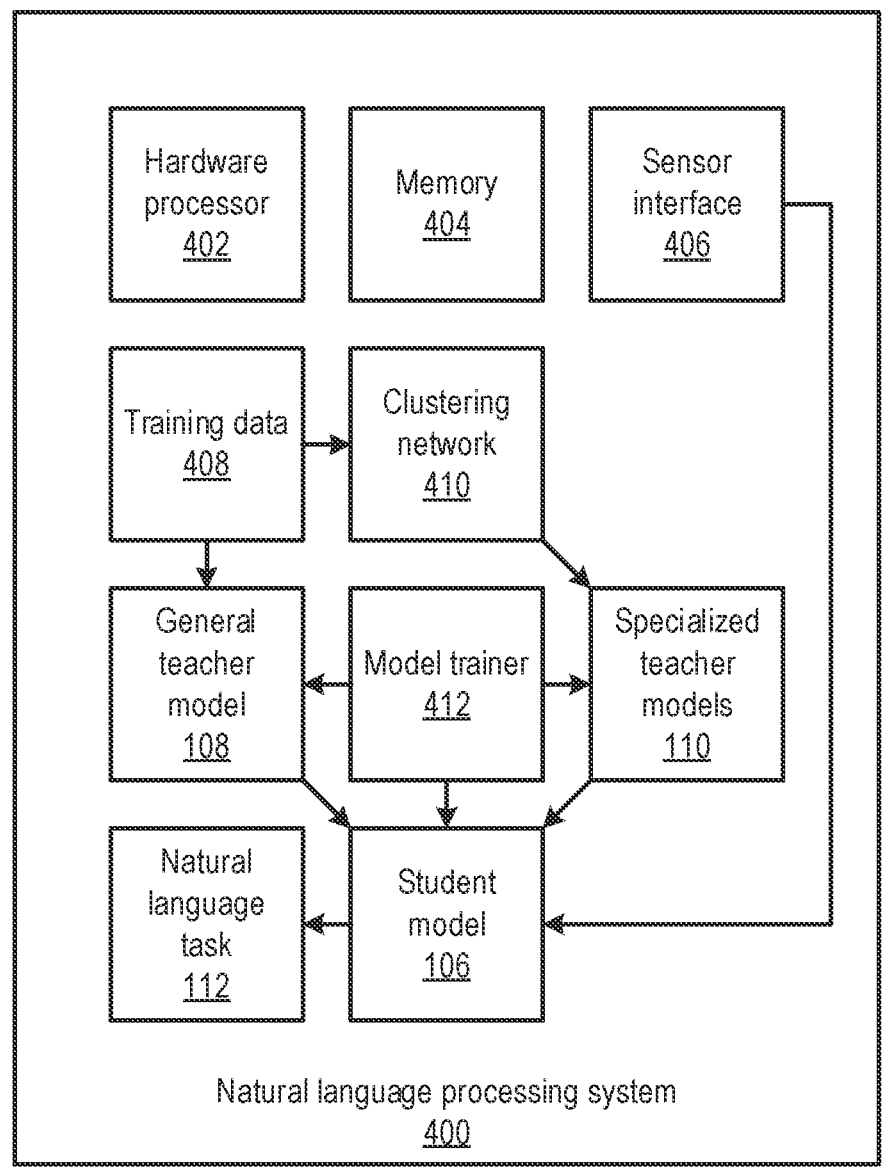
FIG. 4 is a block diagram of a natural language processing system that trains a student model based on a general teacher model and specialized teacher models for different acoustic conditions, in accordance with an embodiment of the present invention.

Referring now to FIG. 4, a natural language processing system 400 is shown. The system 400 includes a hardware processor 402 and memory 404. A sensor interface 406 receives waveform information from a sensor, such as a microphone 104. Training data 408 may be stored in the memory 404.

Clustering network 410 performs clustering on the training data 408 as described above, providing training subsets that correspond to different acoustic conditions. The training data 408 is used by model trainer 412 to train a general teacher model 108. The clustered subsets of the training data 408, generated by the clustering network 410, are used by the model trainer 412 to train respective specialized teacher models 110. The general teacher model 108 and the specialized teacher models 110 are used to generate soft labels for the training data, and the model trainer 412 uses these soft labels to train a student model 106.

The trained student model 106 receives a new utterance from the sensor interface 406. The student model 106 performs, for example, automated speech recognition on the utterance, and generates a text output. Natural language task 112 then accepts the text output, providing an appropriate response.

The general teacher model 108, the specialized teacher models 110, and the student teacher model 106 may each be implemented as respective artificial neural networks (ANNs). An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 5:
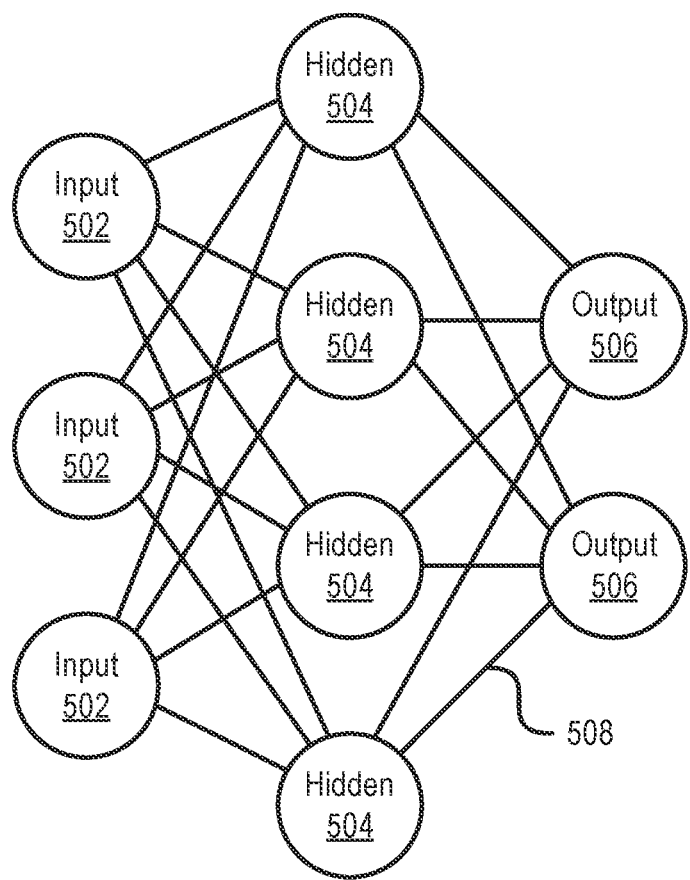
FIG. 5 is a generalized diagram of an artificial neural network that illustrates features of a neural network in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There can be any number of layers of hidden neurons 504, and as well as neurons that perform different functions. There exist different neural network structures as well, such as convolutional neural network, maxout network, etc. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

Figure 6:
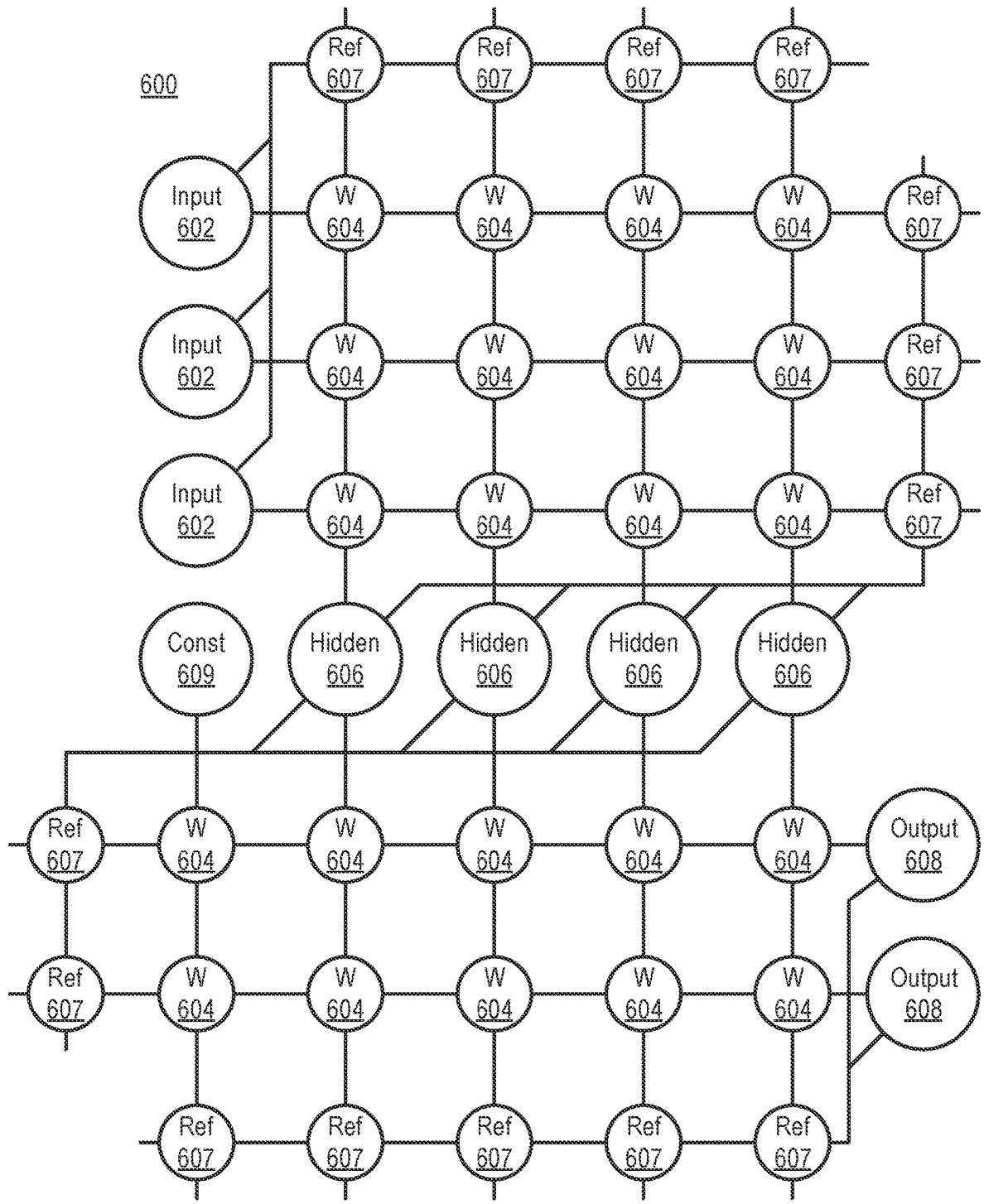
FIG. 6 is a generalized diagram of a particular artificial neural network architecture that illustrates features of a neural network in accordance with an embodiment of the present invention.

Referring now to FIG. 6, an exemplary architecture 600 is shown for an ANN. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 602 each provide an input voltage in parallel to a respective row of weights 604. In the hardware embodiment described herein, the weights 604 each have a settable resistance value, such that a current output flows from the weight 604 to a respective hidden neuron 606 to represent the weighted input. In software embodiments, the weights 604 can simply be represented as coefficient values that are multiplied against the relevant neuron outputs.

Following the hardware embodiment, the current output by a given weight 604 is determined as $$I = \frac{V}{r},$$

where V is the input voltage from the input neuron 602 and r is the set resistance of the weight 604. The current from each weight adds column-wise and flows to a hidden neuron 606. A set of reference weights 607 have a fixed resistance and combine their outputs into a reference current that is provided to each of the hidden neurons 606. Because conductance values can only be positive numbers, some reference conductance is needed to encode both positive and negative values in the matrix. The currents produced by the weights 604 are continuously valued and positive, and therefore the reference weights 607 are used to provide a reference current, above which currents are considered to have positive values and below which currents are considered to have negative values. The use of reference weights 607 is not needed in software embodiments, where the values of outputs and weights can be precisely and directly obtained. As an alternative to using the reference weights 607, another embodiment can use separate arrays of weights 604 to capture negative values.

The hidden neurons 606 use the currents from the array of weights 604 and the reference weights 607 to perform some calculation. The hidden neurons 606 then output a voltage of their own to another array of weights 604. This array performs in the same way, with a column of weights 604 receiving a voltage from their respective hidden neuron 606 to produce a weighted current output that adds row-wise and is provided to the output neuron 608.

It should be understood that any number of these stages can be implemented, by interposing additional layers of arrays and hidden neurons 606. It should also be noted that some neurons can be constant neurons 609, which provide a constant output to the array. The constant neurons 609 can be present among the input neurons 602 and/or hidden neurons 606 and are only used during feed-forward operation.

During back propagation, the output neurons 608 provide a voltage back across the array of weights 604. The output layer compares the generated network response to training data and computes an error. The error is applied to the array as a voltage pulse, where the height and/or duration of the pulse is modulated proportional to the error value. In this example, a row of weights 604 receives a voltage from a respective output neuron 608 in parallel and converts that voltage into a current which adds column-wise to provide an input to hidden neurons 606. The hidden neurons 606 combine the weighted feedback signal with a derivative of its feed-forward calculation and stores an error value before outputting a feedback signal voltage to its respective column of weights 604. This back propagation travels through the entire network 600 until all hidden neurons 606 and the input neurons 602 have stored an error value.

During weight updates, the input neurons 602 and hidden neurons 606 apply a first weight update voltage forward and the output neurons 608 and hidden neurons 606 apply a second weight update voltage backward through the network 600. The combinations of these voltages create a state change within each weight 604, causing the weight 604 to take on a new resistance value. In this manner the weights 604 can be trained to adapt the neural network 600 to errors in its processing. It should be noted that the three modes of operation, feed forward, back propagation, and weight update, do not overlap with one another.

As noted above, the weights 604 can be implemented in software or in hardware, for example using relatively complicated weighting circuitry or using resistive cross point devices. Such resistive devices can have switching characteristics that have a non-linearity that can be used for processing data. The weights 604 can belong to a class of device called a resistive processing unit (RPU), because their non-linear characteristics are used to perform calculations in the neural network 600. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
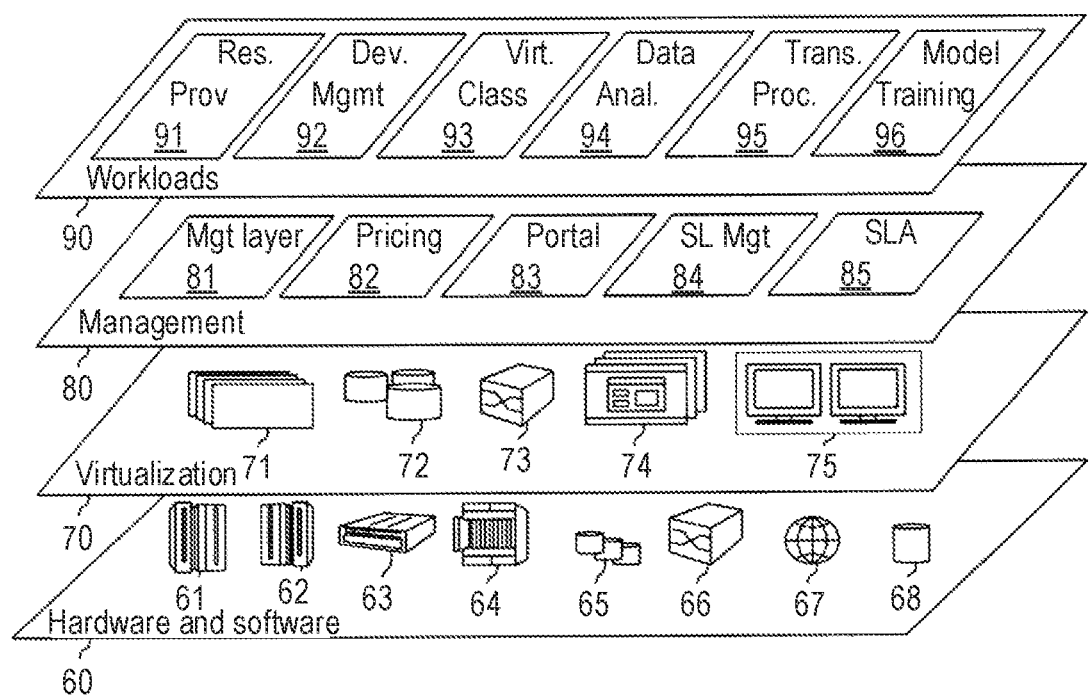
FIG. 7 is a block diagram showing an illustrative cloud computing environment having one or more cloud computing nodes with which local computing devices used by cloud consumers communicate in accordance with one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
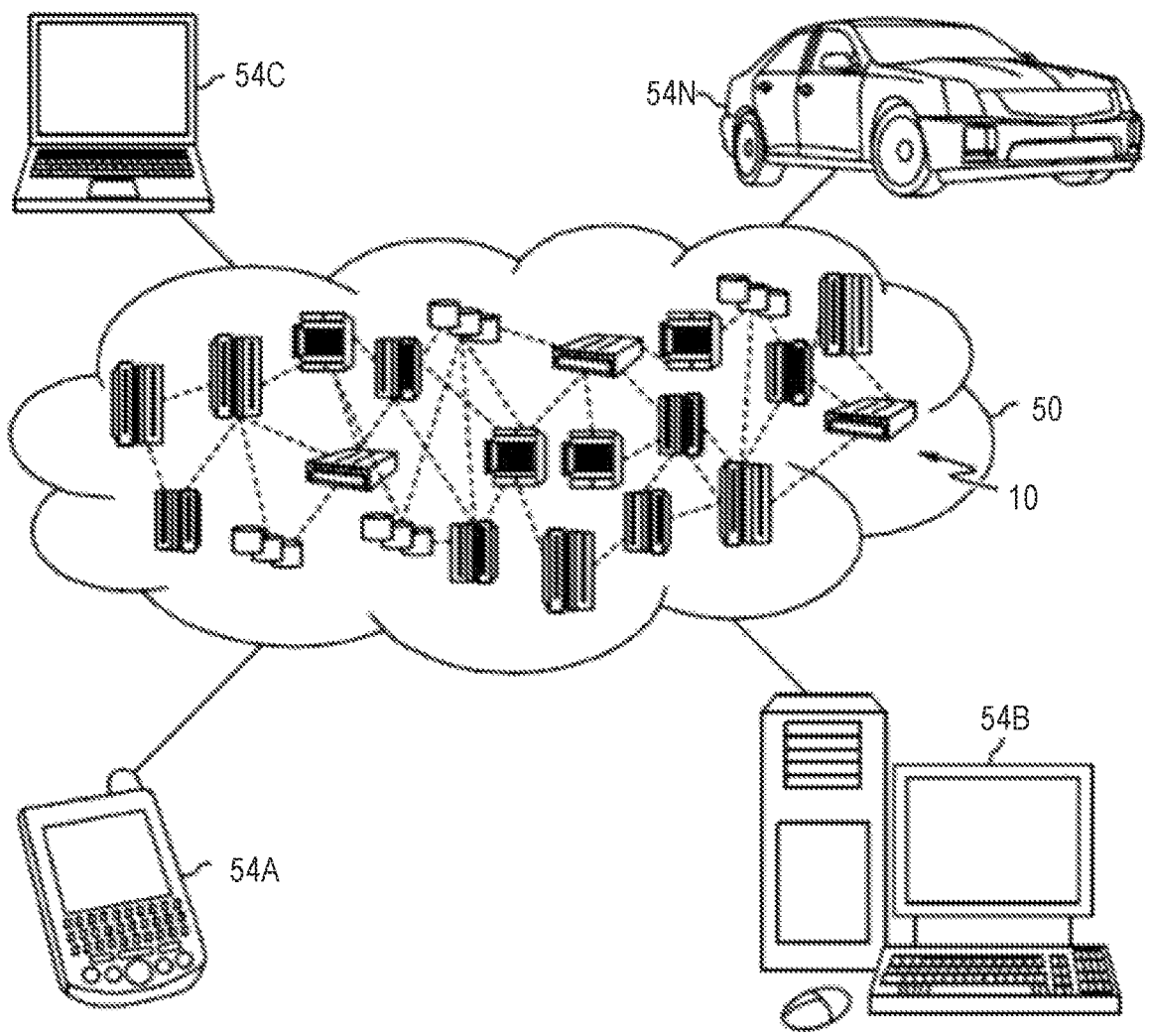
FIG. 8 is a block diagram showing a set of functional abstraction layers provided by a cloud computing environment in accordance with one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model training 96.

Having described preferred embodiments of knowledge distillation using deep clustering (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a neural network, comprising:
   clustering, by a clustering neural network, a full set of training data samples into a plurality of specialized training clusters according to acoustic conditions estimated through a generated supervector using an average of phone alignment information, representing frame alignment of phonemes, by employing log likelihoods of the acoustic conditions concatenated with averaged log Mel-frequency features for context-dependent phonemes as features estimated by a general teacher neural network;
   training a plurality of specialized teacher neural networks using respective specialized training clusters of the plurality of specialized training clusters;
   generating soft labels for the full set of training data samples using the plurality of specialized teacher neural networks; and
   training a student model using the full set of training data samples, the specialized training clusters, and the soft labels.

2. The method of claim 1, wherein the training data samples include acoustic waveforms.

3. The method of claim 1, wherein clustering includes unsupervised deep clustering.

4. The method of claim 1, further comprising training a general teacher neural network using the full set of training data samples.

5. The method of claim 4, wherein generating the soft labels further uses the general teacher neural network.

6. The method of claim 5, wherein training the student model comprises minimizing a loss function:

$$\mathcal{L} = -(1-\lambda)\sum_i q_{bl}(i|x)\log p(i|x) - \lambda\sum_i q_{sp}(i|x)\log p(i|x)$$

where $\lambda$ is a weight hyperparameter, $q_{bl}$ is a set of soft labels from the general teacher neural network, $q_{sp}$ is a set of soft labels from the plurality of specialized teacher neural networks, and $p(i|x)$ is a probability of a class from the student model, with i indicating an index of context-dependent phonemes and x indicating an input signal.

7. The method of claim 4, wherein the student model is a neural network that has fewer parameters than the general teacher neural network.

8. The method of claim 1, further comprising performing speech recognition on a new utterance using the trained student model.

9. The method of claim 8, further comprising performing a natural language task on recognized speech from the new utterance.

10. A non-transitory computer readable storage medium comprising a computer readable program for training a neural network, wherein the computer readable program when executed on a computer causes the computer to:
    cluster, by a clustering neural network, a full set of training data samples into a plurality of specialized training clusters according to acoustic conditions estimated through a generated supervector using an average of phone alignment information, representing frame alignment of phonemes, by employing log likelihoods of the acoustic conditions concatenated with averaged log Mel-frequency features for context-dependent phonemes as features estimated by a general teacher neural network;
    train a plurality of specialized teacher neural networks using respective specialized training clusters of the plurality of specialized training clusters;
    generate soft labels for the full set of training data samples using the plurality of specialized teacher networks; and
    train a student model using the full set of training data samples, the specialized training clusters, and the soft labels.

11. The non-transitory computer readable storage medium of claim 10, wherein the training data samples include acoustic waveforms.

12. The non-transitory computer readable storage medium of claim 10, wherein computer readable program further causes the computer to perform unsupervised deep clustering on the full set of training data samples.

13. The non-transitory computer readable storage medium of claim 10, wherein computer readable program further causes the computer to train a general teacher neural network using the full set of training data samples.

14. The non-transitory computer readable storage medium of claim 13, wherein computer readable program further causes the computer to use the general teacher neural network to generate soft labels.

15. The non-transitory computer readable storage medium of claim 14, wherein computer readable program further causes the computer to a loss function to train the student model:

$$\mathcal{L} = -(1-\lambda)\sum_i q_{bl}(i|x)\log p(i|x) - \lambda\sum_i q_{sp}(i|x)\log p(i|x)$$

where $\lambda$ is a weight hyperparameter, qui is a set of soft labels from the general teacher neural network, $q_{sp}$ is a set of soft labels from the plurality of specialized teacher neural networks, and $p(i|x)$ is a probability of a class from the student model, with i indicating an index of context-dependent phonemes and x indicating an input signal.

16. The non-transitory computer readable storage medium of claim 13, wherein the student model is a neural network that has fewer parameters than the general teacher neural network.

17. The non-transitory computer readable storage medium of claim 10, wherein computer readable program further causes the computer to perform speech recognition on a new utterance using the trained student model.

18. A system for training a neural network, comprising:
    a hardware processor; and
    a memory that stores computer program code which, when executed by the hardware processor, implements:
    a student model;
    a clustering neural network that clusters a full set of training data samples into a plurality of specialized training clusters according to acoustic conditions estimated through a generated supervector using an average of phone alignment information, representing frame alignment of phonemes, by employing log likelihoods of the acoustic conditions concatenated with averaged log Mel-frequency features for context-dependent phonemes as features estimated by a general teacher neural network;

a plurality of specialized teacher neural networks that together generate soft labels for the full set of training data samples; and a model trainer that trains the plurality of specialized teacher neural networks using respective specialized training clusters of the plurality of specialized training clusters, and that trains a student model using the full set of training data samples, the specialized training clusters, and the soft labels.

* * * * *